United States Patent [19]

Yumura et al.

[11] Patent Number: 4,740,946

[45] Date of Patent: Apr. 26, 1988

[54] DATA CONVERTER PICKUP CARRIAGE ASSEMBLY

[75] Inventors: Takashi Yumura; Tetsu Yamamoto; Kiyosi Funai; Sadao Okada, all of Hyogo, Japan

[73] Assignee: Mitsubishi Denki Kabushiki Kaisha, Tokyo, Japan

[21] Appl. No.: 826,697

[22] Filed: Feb. 6, 1986

[30] Foreign Application Priority Data

Feb. 8, 1985 [JP] Japan .................. 60-23740
Aug. 22, 1985 [JP] Japan ................. 60-186250

[51] Int. Cl.⁴ .................. G11B 7/12; H02K 41/02
[52] U.S. Cl. ................................... 369/219; 310/13
[58] Field of Search ............... 369/219, 220; 310/13

[56] References Cited

U.S. PATENT DOCUMENTS 3,751,693  8/1973  Gaber ........................... 310/13
4,404,671  9/1983  Kuribayashi et al. ......... 369/219
4,443,721  4/1984  Jansen .......................... 310/14
4,570,249  2/1986  Malissin et al. ............... 369/219
4,571,649  2/1986  Goss ............................. 310/13
4,631,431  12/1986  Viskochil ...................... 310/13

FOREIGN PATENT DOCUMENTS 211363  12/1983  Japan .

Primary Examiner—Steven L. Stephan
Attorney, Agent, or Firm—Sughrue, Mion, Zinn, Macpeak, and Seas

[57] ABSTRACT

An improved carriage assembly for linearly reciprocating a data converter pickup or the like. Magnetic circuits are provided on each side of a carriage, and a driving coil wound on a transversely solid type coil bobbin which surrounds the carriage, is magnetically linked with the two magnetic circuits. Guide rails are provided between the carriage and the two magnetic circuits. The moving elements including the carriage, the driving coil, and the bobbin are supported on the guide rails for linear movement therealong by rollers.

8 Claims, 8 Drawing Sheets

FIG. 9

| ARRANGEMENT OF GUIDE RAIL | | INSIDE CENTER YOKE | BELOW CENTER YOKE | UPPER CENTER YOKE | CROSS TO CENTER YOKE | OUTSIDE COIL BELOW CENTER YOKE |
|---|---|---|---|---|---|---|
| CONSTRUCTION | | | | | | |
| MASS OF MOVABLE PORTION | | ◎ LIGHTEST | △ HEAVY | × RATHER HEAVY | × RATHER HEAVY | △ HEAVY |
| GAP BETWEEN A WORKING POINT OF DRIVING FORTH AND THE CENTER OF GRAVITY | | ◎ NIL | ○ SMALL | × RATHER LARGE | △ A LITTLE LARGE | ○ SMALL |
| STABILITY UNDER A CONDITION IN WHICH BEARING PRESSURE AND THE SELF-WEIGHT IS APPLIED | IN CASE ASSEMBLY IS HORIZONTALLY PLACED | ◎ STABLE | ◎ STABLE | ◎ STABLE | △ ASYMMETRY AND A LITTLE UNSTABLE | ◎ STABLE |
| | IN CASE ASSEMBLY IS VERTICALLY PLACED | ○ ALMOST STABLE | × SUPPORTED BY ONE SIDE AND UNSTABLE | ○ ALMOST STABLE | ○ ALMOST STABLE | × SUPPORTED BY ONE SIDE AND UNSTABLE |
| DIMENSION | | ○ SMALLEST IN HEIGHT | △ LARGE IN HEIGHT | △ LARGE IN HEIGHT | △ LARGE IN HEIGHT | × LARGE IN HEIGHT |
| PRODUCTIVITY | WORKING | ○ EASY | △ A LITTLE HARD | △ A LITTLE HARD | × HARD DUE TO ASYMMETRY | △ A LITTLE HARD |
| | CONSTRUCTION | △ HARD SINCE GUIDE RAIL IS PLACED IN COIL | △ HARD SINCE GUIDE RAIL IS PLACED IN COIL | △ HARD SINCE GUIDE RAIL IS PLACED IN COIL | × HARD DUE TO ASYMMETRY | ○ EASY SINCE GUIDE RAIL IS PLACED OUTSIDE COIL |
| | ADJUSTMENT | △ DITTO | △ DITTO | △ DITTO | × DITTO | ○ DITTO |
| ASSESSMENT | | ◎ BEST | ○ BETTER | × | × | △ |

A→ : DIRECTION OF GRAVITY IN CASE THE ASSEMBLY IS HORIZONTALLY PLACED.

B↓ : DIRECTION OF GRAVITY IN CASE THE ASSEMBLY IS VERTICALLY PLACED.

DATA CONVERTER PICKUP CARRIAGE ASSEMBLY

BACKGROUND OF THE INVENTION

FIG. 1 is a perspective view of a conventional carriage assembly as described in Japanese patent application No. 57-93897.

The carriage assembly shown in FIG. 1 includes a carriage 11 on which a pickup 12 is mounted; outer case yokes 13 of magnetic circuits constituting fixed-side driving sources; permanent magnets 14 fixed to, for instance, the outer case yokes 13; center pole pieces 15 of the fixed-side driving sources installed on both sides of the carriage 11 for driving the carriage 11, the fixed-side driving sources including the outer case yokes 13, the permanent magnets 14, and the center pole pieces 15; movable side coil bobbins 16 on which driving coils 17 are wound, the movable elements including the carriage 11, the pickup 12, coil bobbins 16, and the coils 17; bearings 18a and 18b for supporting the movable elements; and guide rails 19a and 19b.

The operation of this carriage assembly is as follows:

The outer case yokes 13 on both sides of the carriage 11, the permanent magnets 14, and the center pole pieces 15 constitute magnetic circuits, the direction of the magnetic field produced thereby pointing in the directions Y and Z indicated in FIG. 2. The coil 17 passes across the magnetic field formed by the magnetic circuit, whereas the current flows in the direction Z against the direction Y of the magnetic field and in the direction Y against the direction Z of the magnetic field. Consequently, the driving force acts in the direction X indicated in FIG. 2. When a target position on a disk has been determined, current is made to flow through the coils 17 in response to instructions from a control unit (not shown), and the carriage 11 is controlled by the driving force so as to move to the target position.

Subsequently, the carriage supporting structure will be described.

Two pairs of bearings 18a, namely, two bearings in front and in rear, are attached to the bottom of the carriage 11, extending generally in the direction of carriage movement with axis of the bearing 18a lying at a certain angle to the XY plane in FIG. 2 and the pair of left- and right-hand bearings 18a being respectively inclined in directions opposite to each other. As the bearings 18a are pressed against the guide rail 19a, they restrain the rotational moments of the carriage 11 around the Y and Z axes and its transverse and downward movement. Moreover, the bearings 18b, attached to both sides of the carriage 11 and pressed against the guide rails 19b installed on both sides of the carriage 11, restrain rotational movement of the carriage 11 around the X axis and upward movement of the carriage 11. Consequently, the movable elements make smooth linear reciprocal movements in only the longitudinal direction (the X direction).

In the conventional carriage assembly thus constructed, as three guide rails 19a, 19b and 19b and two pairs of fixed-side driving sources are required to reciprocate the carriage 11 linearly and smoothly, the width of the assembly is relatively great, as seen in FIG. 3. Also, there are problems such as high production costs because both the number of parts and the number of assembly steps are high. Moreover, the guide rails 19a installed on the bottom of the carriage 11 and the coils 17 on both sides thereof make the total height and width of the overall assembly great.

SUMMARY OF THE INVENTION

The present invention is intended to solve the above-described problems, and it is therefore an object of the invention to provide a compact carriage assembly employing only a small number of parts.

Specifically, it is an object of the invention to provide a more compact carriage assembly by reducing the weight of the moving elements to thus decrease the driving force and thus power consumption of the carriage assembly.

The carriage assembly according to the present invention comprises magnetic circuits provided on both sides of the carriage, a driving coil wound on a transversely solid type coil bobbin formed in such a manner as to be magnetically linked with each of the magnetic circuits and to surround the carriage, guide rails respectively provided in spaces between both sides of the carriage and the coil bobbin, and a necessary number of rollers for supporting the guide rails, the rollers being installed on both sides of the carriage so that the moving element undergoes linear reciprocal movement only along the guide rails.

With the inventive arrangement of the rollers relative to the guide rails, only the guide rails on the two sides of the carriage are used to restrain rotational movement of the carriage around the X, Y and Z axes and its transverse and vertical movement. Consequently, stable linear reciprocal movement of the carriage along the guide rails is attained and, by thus controlling the movement of the carriage, a data converter can be quickly and accurately brought to a target position.

Further, in a carriage assembly according to the present invention, guide rails for guiding a carriage are installed between the carriage and the center pole pieces of left- and right-hand magnetic circuits. With the guide rails for guiding the carriage installed between the carriage and the center pole pieces, the carriage and the driving coil can be made compact and lightweight, whereby the carriage can be linearly reciprocated with a small driving force.

BRIEF DESCRIPTION OF THE DRAWINGS

FIG. 9 is a view showing various arrangements of the guide rails;

DESCRIPTION OF THE PREFERRED EMBODIMENTS

Figure 4:
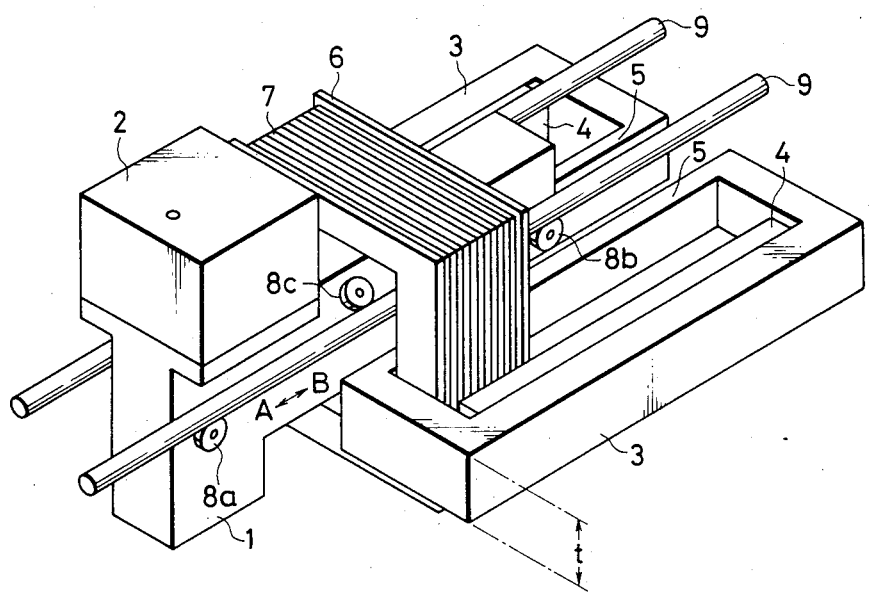
FIG. 4 is a perspective view of a first embodiment of a carriage assembly of the present invention.

FIG. 4 is a perspective view of a first embodiment of a carriage assembly of the present invention.

In FIG. 4, the carriage assembly includes a carriage 1 on which a pickup 2 is mounted, outer case yokes 3 constituting fixed-side driving sources, permanent magnets 4 fixed to the outer case yokes 3, center pole pieces 5 incorporated in the outer case yokes 3 and forming parts of the magnetic circuits, and a movable-side coil bobbin 6 having a transversely solid form, a driving coil 7 being wound on the coil bobbin 6. The coil bobbin 6 on which the coil 7 is wound is magnetically linked with each of the magnetic circuits on either side and surrounds the carriage 1. The carriage 1, the pickup 2, the coil bobbin 6, and the coil 7 constitute moving elements. The carriage assembly further includes roller bearings 8a, 8b and 8c supporting the moving elements, the bearings 8a and 8b being respectively provided at both ends of the carriage 1 and extending at a fixed angle with respect to its direction of movement, and the bearings 8c being provided midway between respective pairs of the bearings 8a and 8b and extending at a fixed angle different from that of the angle of the bearings 8a and 8b; and guide rails 9 installed in spaces between both sides of the carriage 1 and the bobbin 6.

The configuration of the coil bobbin 6 will be described. The coil bobbin 6 is of a transversely solid type, square-shaped in cross section, and constructed so as to pass through the magnetic circuits on both sides of the carriage 1 and through the carriage 1 and to surround the carriage 1

Figure 1:
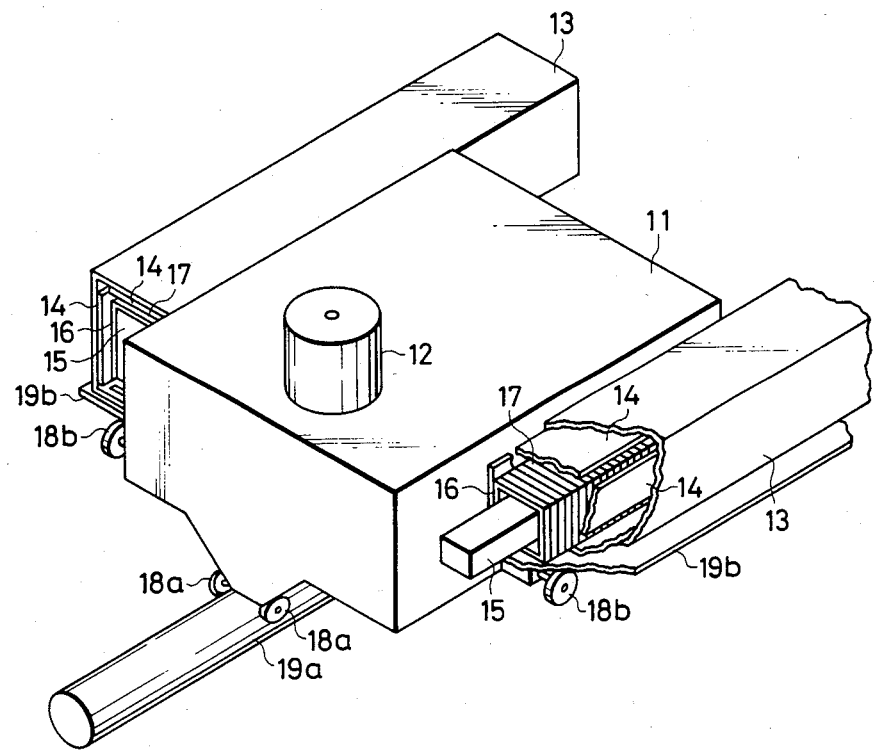
FIG. 1 is a perspective view of a conventional carriage assembly.
Figure 2:
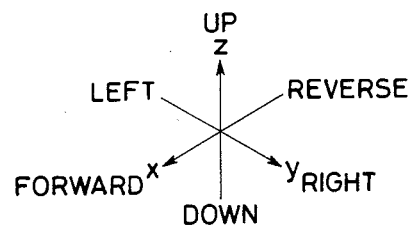
FIG. 2 is a diagram illustrating directions of a magnetic field.
Figure 3:
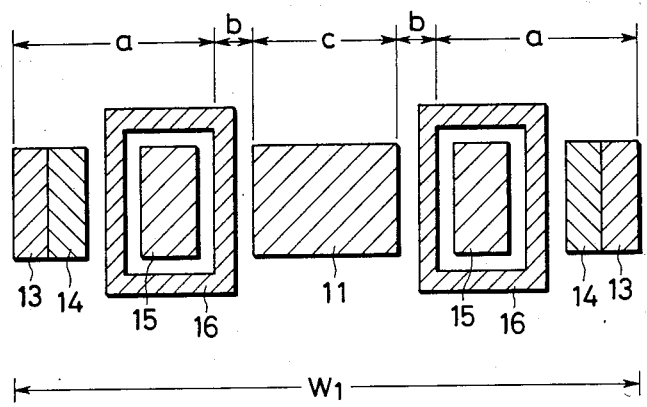
FIG. 3 is a diagram illustrating the breadth of the conventional assembly.
Figure 6:
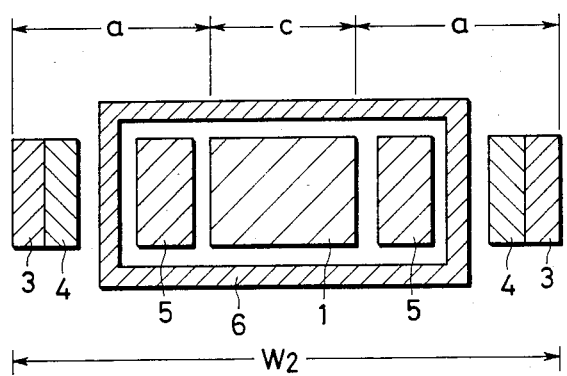
FIG. 6 is a diagram illustrating the breadth of the carriage assembly according to the first embodiment of the present invention.

The reason for this arrangement of the transversely solid type coil bobbin 6 is that, because the breadth $W_1$ in the case of a conventional transversely separate type bobbin is, as shown in FIG. 3:

$$W_1 = 2a + 2b + c,$$

whereas the breadth $W_2$ in the case of the present invention (FIG. 6) is:

$$W_2 = 2a + c,$$

the breadth can be made shorter than $W_1$ by a value of $2b$. Consequently, the number of parts is reduced and the production cost decreased.

Figure 5:
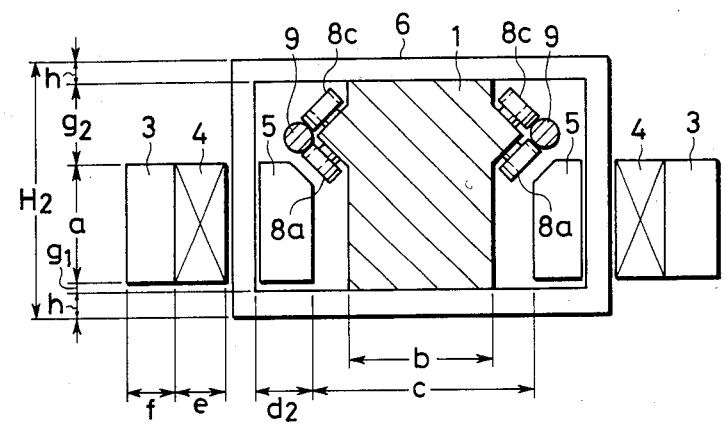
FIG. 5 is a cross-sectional view of the carriage assembly of FIG. 4.
Figure 12A:
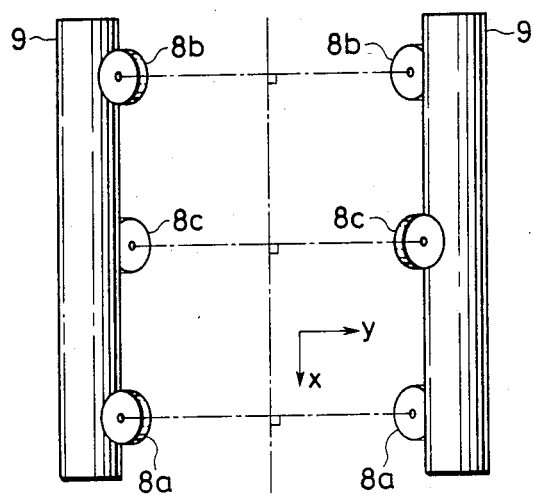
FIGS. 12(a) and 12(b) are views showing an arrangement of bearings.
Figure 12B:
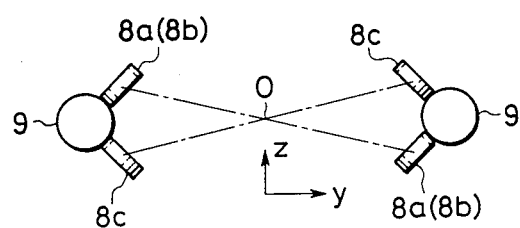

The support structure for the moving elements will be described. As shown in FIG. 5, two guide rails on both sides of the carriage 1 are used to restrain the moving elements. As shown in FIG. 12, the front and rear bearings 8a and 8b are attached on both sides of the carriage 1 at a certain angle to the YZ plane. Each bearing 8c is placed midway between the bearings 8a and 8b at a position so as to sandwich the guide rail 9 and is oriented at an angle opposite that of the bearings 8a and 8b with respect to the YZ plane. The guide rail 9 is pressed against the bearings 8a to 8c installed on both sides of the carriage 1 to complete the support structure.

Figure 13A:
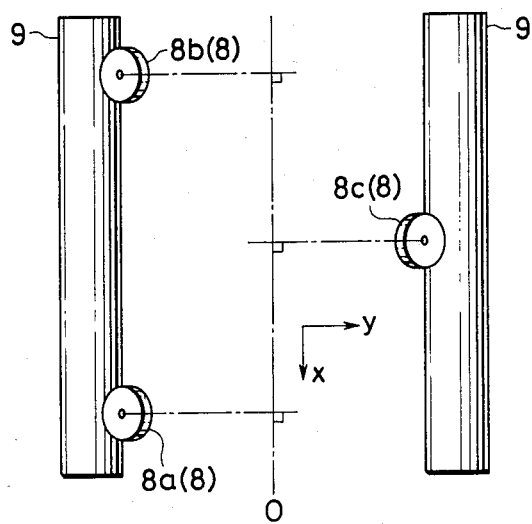
FIGS. 13(a) and 13(b) are views showing another arrangement of bearings.
Figure 13B:
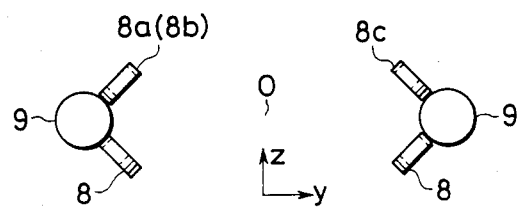

Another arrangement of bearings will be described with reference to FIGS. 13(a) and 13(b). In this arrangement, two pairs of bearings 8a(8) and 8b(8) are attached on one side of the carriage. On the other hand, a pair of bearings 8c(8) are attached on the other side of the carriage at a position facing a mid portion between the two pairs of bearings 8a(8) and 8b(8).

The carriage assembly thus constructed makes the following possible:

(1) The bearings 8a to 8c installed on both sides of the carriage 1 and the two guide rails 9 on both sides of the carriage 1 operate to restrain rotational movement around the X, Y and Z axes and vertical as well as transverse movements.

(2) The two guide rails 9 are used for linearly reciprocating the carriage 1 accurately and smoothly in the longitudinal direction (as shown by arrows A and B in FIG. 4).

(3) As guide rails and bearings on the under surface of the conventional carriage assembly can be dispensed with, not only is thickness in the vertical direction reduced, but also production costs can be decreased because of the decrease in the number of parts.

The position of the guide rails will be described next. As shown in FIG. 4, the center pole pieces 5 pass between the carriage 1 and the coil bobbin 6. If the thickness t of each center pole piece 5 is less than that of the coil bobbin 6, there will be a region above the center pole piece 5. Accordingly, space is saved by passing the guide rail 9 through this region. Moreover, unwanted vibration is also prevented because the support structure is located close to the carriage 1 and thus is capable of directly supporting the carriage 1 so that stable, smooth, linear reciprocal movement is effected.

Comparison results between a conventional carriage assembly using a transversely separate type coil bobbin and a carriage assembly of the present invention using a transversely solid type coil bobbin, will be described.

(1) The dimension of the conventional assembly is large as compared with the assembly of the present invention under a definite driving force. In the conventional assembly, when its height is restricted, its width becomes large, whereas when its width is restricted, its height becomes large. On the contrary, the dimension of the assembly of the present invention can be made compact as compared with the conventional assembly, especially, in both of its height and width.

(2) The amount of heat generated in the conventional assembly (electric power consumed by the coil) is large, for example, 4.8 W. On the other hand, that of the assembly of the present invention is small, for example, 4.2 W.

(3) The number of parts of the conventional assembly is large by two coils and screws for the attachment of the coils. On the other hand, the number of parts of the assembly of the present invention is small. Especially, since only one coil is used in the present invention, manufacturing cost can be decreased.

(4) In the conventional assembly, since the portion of coil bobbin for attachment to the carriage is a thin plate, the rigidity of the coil is hardly raised and the resonant frequency is low, for example, 1240 Hz. On the other hand, in the assembly of the present invention, the thickness of the coil and the coil bobbin in the moving direction is large, so that the vent rigidity in that direction is large and the resonant frequency is high, for example, 5225 Hz. Also, the assembly of the present invention is very stable since bearings are attached on the both sides of the carriage at a position near to the center of the gravity of the carriage.

Figure 10:
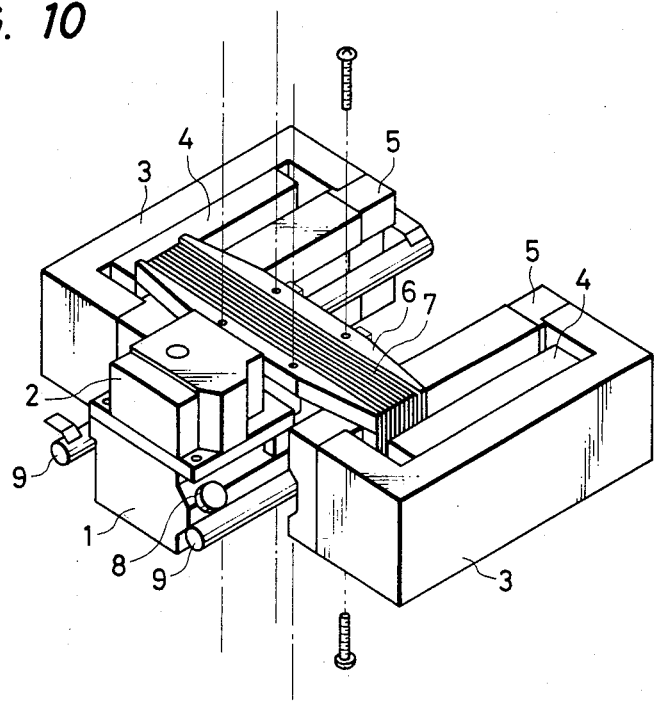
FIG. 10 is a perspective view showing the best mode of a carriage assembly of the present invention.
Figure 11:
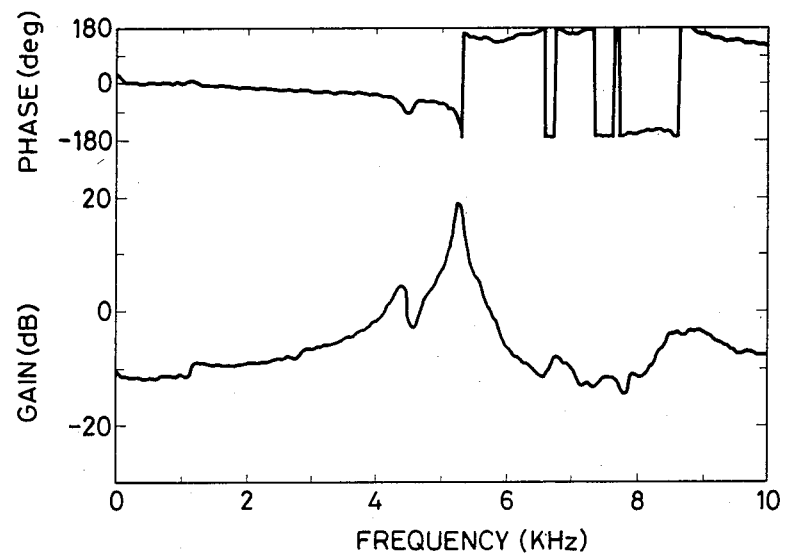
FIG. 11 is a view showing a result for frequency response measurement.

Frequency resonse was measured by using a carriage assembly shown in FIG. 10. FIG. 11 shows the result of the measurement.

The operation of the carriage assembly will be described.

When the target position of a disk is determined, current is caused to flow through the coil 7 by instructions from a control unit (not shown). On receiving a longitudinal driving force, the moving element supported by the above-described support structure makes a smooth linear reciprocal movement and reaches a target position. Positioning is thus completed.

Although the two guide rails 9 on both sides of the carriage 1 are used to restrain rotation around the Y and Z axes, in the above-described embodiment, only one of the guide rails may be used for the purpose of such restraint and the other used for bearing the weight of the carriage 1. Although description has been given of a support structure using roller-type bearings, the guide rails may be supported by sliding bearings made of a smooth material such as fluoroplastics.

As set forth above, the carriage assembly according to the present invention includes a drive coil wound on a transversely solid type coil bobbin formed in such a manner as to be magnetically linked with each of the magnetic circuits formed on both sides of a carriage and to surround the carriage, guide rails provided in spaces between both sides of the carriage and the coil bobbin, and a plurality of rollers for supporting the moving element between both ends in the carriage travel direction and both transversal ends thereof so that the moving elements can undergo only a linear reciprocal movement. The present invention consequently provides a compact and inexpensive apparatus capable of smooth linear reciprocal movement with a small number of parts while requiring fewer assembly steps.

Figure 7:
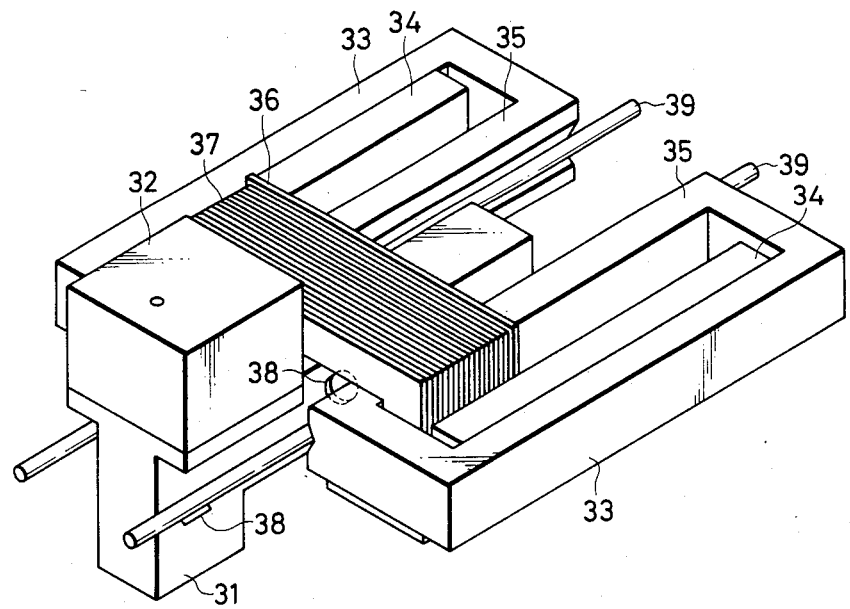
FIG. 7 is a perspective view of a second embodiment of a carriage assembly of the present invention.

FIG. 7 is a perspective view of a second embodiment of a carriage assembly of the present invention. In FIG. 7, the carriage assembly includes a carriage 31 on which, for example, a pickup 32 is mounted, outer case yokes 33 constituting fixed-side driving sources, permanent magnets 34 fixed to, for instance, the outer case yokes 33, center pole pieces 35 incorporated in the outer case yokes 33 and constituting the magnetic circuits, and a movable-side coil bobbin 36 having a transversely solid form, a driving coil 37 being wound on the coil bobbin 36. The coil bobbin 36 on which the coil 37 is wound is magnetically linked with each of the magnetic circuits on either side and surrounds the carriage 31. The carriage 31, the pickup 32, the coil bobbin 36, and the coil 37 constitute moving elements. The carriage assembly further includes bearings (rollers) 38 supporting the moving element, three of the bearings 38 being arranged on both sides of upper and lower parts of the carriage 31. The bearings contact the guide rails 39 arranged between the carriage 31 and the center pole pieces 35 at a fixed angle to the guide rails 39, whereby the bearings support and allow the carriage 31 to undergo linear reciprocal movement while restraining its movement in the vertical and transverse directions.

Subsequently, the relation among the carriage 31, the center pole pieces 35, the coil bobbin 36, and the guide rails 39 will be described.

Figure 8:
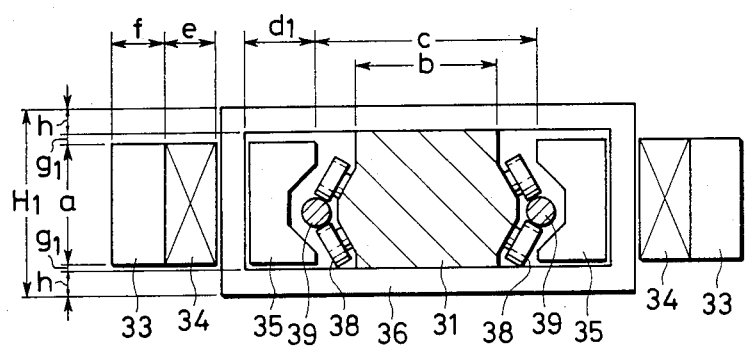
FIG. 8 is a sectional view of the carriage assembly of FIG. 7.

FIG. 8 is a sectional view of the second embodiment of the present invention of FIG. 7. As seen in FIG. 8, the guide rails 39 are installed between the carriage 31 and the center pole pieces 35, and the center pole piece 35 has an appropriate cross-sectional area. Moreover, the portion of the center pole piece confronting the guide rails 39 and the bearings 38 is in a concave shape to minimize the breadth of the coil bobbin 36. The bearings 38 are attached on both sides of the carriage 31 in the same manner to the arrangement shown in FIGS. 12 or 13. The vertical dimension of the carriage 31 can be reduced to a minimum gap between the center pole piece 35 and the coil bobbin 36. The distance c between the center pole piece 35 designates a minimum dimension necessary for the carriage 31 (having a convex shape) to undergo a linear reciprocal movement between the center pole pieces 35. In FIG. 8, sections corresponding to those of FIG. 5 are also represented by a, b, c, e, f, $g_1$ and h, whereas the breadth of the center pole piece 35 is represented by $d_1$ and the height of the bobbin by $H_1$.

Subsequently, the configuration of the coil bobbin 36 will be described.

As shown in FIG. 5, the vertical dimension $H_2$ of the coil bobbin 6 of the first embodiment of FIG. 5 is given by:

$$H_2 = a + 2h + g_1 + g_2,$$

whereas the vertical dimension $H_1$ of the coil bobbin 36 according to the second embodiment is given by:

$$H_1 = a + 2(h + g_1).$$

$H_1$ is thus smaller by $g_2 - g_1$ than $H_2$. Satisfactorily, $g_1$ is about 0.5 mm in such a state that the coil bobbin 36 is not in contact with the center pole piece 35. Obviously, $g_1$ is smaller than $g_2$. Although the width of the latter is greater than that of the former by $2(d_1 - d_2)$, the value of $2(d_1 - d_2)$ can be decreased if the height a of the center pole piece 35 is made equal to that of the former. In that case, the width of the coil bobbin 36 increases to some extent.

The operation of the carriage assembly according to this embodiment of the present invention will be described.

The outer case yokes 33, the permanent magnets 34, and the center pole pieces 35 installed on both sides of the carriage constitute magnetic circuits. The direction of the magnetic field points in the direction Z against the direction Y of the magnetic field formed by the magnetic field of the magnetic circuit. Accordingly, a driving force acts in the X direction. Current flows through the driving coil 37 in response to instructions from a control unit (not shown) when the target position of a disk is determined. Then, the carriage 31 is controlled by the driving force so as to move to the target position.

The driving force $F_s$ can be expressed by:

$$F_s = K_F(I_c - K_F v),$$

where $I_c$ = current flowing through the coil, $K_F$ = power constant of the linear motor, and $v$ = maximum travel velocity of the carriage 31.

The power constant is given by:

$$K_F = m/I_c(\tau_a/T_{av})^2 L,$$

where $I_c$ = current flowing through the coil, m = mass of the carriage, $\tau_a$ = time constant, $T_{av}$ = mean travel time, and L=travel distance. The coil current $I_c$ is proportional to the mass m of the carriage, provided that $K_F$, $\tau_a$, $T_{av}$ and L are set under the same conditions. Accordingly, if the mass m of the carriage is small, the coil current $I_c$ and the driving force required for moving the carriage 31 may be reduced.

The power consumption P is expressed by:

$$P = I_c^2 R_c,$$

where $I_c$=coil current and $R_c$=coil resistance; hence, the power consumption decreases in proportion to the square of the coil current $I_c$. Accordingly, the power consumption P can be reduced in proportion to the square of the mass m of the carriage by making the carriage 31 light in weight.

FIG. 9 shows comparison results between embodiments having various arrangements of the guide rails. As is apparent from FIG. 9, the embodiment in which the guide rail is positioned inside the center yoke, is most preferable.

The present invention has advantages as follows:

(1) A carriage assembly according to the present invention can be made compact as composed with the conventional carriage assembly in height and width under the same driving force, since a pair of coils provided on the both sides of the conventional carriage assembly are combined in a body and guide rails are installed in space between both sides of the carriage and the coil bobbin.

(2) The rigidity of the coil can be raised and the resonant frequency of the entire assembly can be raised as compared with the conventional assembly since transversely solid type coil is used in the carriage assembly of the present invention. As a result, an actuator having high responsibility can be attained.

As set forth above, a compact lightweight carriage assembly is provided because its guide rails are installed between the carriage and the respective central magnetic poles. For that reason, it is possible to reduce the space required for the overall carriage assembly installation. Also, the required power is reduced.

We claim:

1. A carriage assembly for linearly reciprocating a data converter to move said data converter to a desired target position by linearly reciprocating a carriage having left- and right-hand opposite sides, said carriage assembly further comprising: left- and right-hand magnetic circuits provided respectively on said opposite sides of said carriage, a coil bobbin having a driving coil wound thereon, said bobbin and coil surrounding said carriage and portions of said left- and right-hand magnetic circuits in such a manner as to be magnetically linked with each of said magnetic circuits and to surround said carriage, and forming spaces between the sides of the carriage and said coil bobbin, guide rails provided respectively in said spaces between the sides of the carriage and said coil bobbin, said guide rails forming guides for said linear reciprocal movement, means mechanically fixing said carriage and said coil bobbin and driving coil carried thereby together, and a plurality of rollers mounted to said carriage for rotation about axes of said rollers and being in peripheral contact with said guide rails at different circumferential positions for supporting on said guide rails said assembly of said carriage, said coil bobbin, and said driving coil so as to limit movement of said assembly to only linear reciprocal movement along said guide rails.

2. The carriage assembly of claim 1, wherein at least three of said rollers are provided on each side of carriage in contact with a respective one of said guide rails, an angle of a center one of each said three rollers with respect to a direction of movement of said carriage being different from an angle of the other two of said three rollers with respect to said direction of movement.

3. The carriage assembly of claim 1, wherein at least two pairs of rollers are provided on one side of carriage and at least a pair of rollers are provided on the other side of carriage in contact with a respective one of said guide rails.

4. The carriage assembly of claim 1, wherein each of said magnetic circuits comprises a generally rectangular-frame yoke case having a permanent magnet fixed to one side thereof, said bobbin passing through said yoke.

5. A carriage assembly for linearly reciprocating a data converter to move said data converter to a desired target position by linearly reciprocating a carriage, said carriage assembly comprising: left- and right-hand magnetic circuits having center pole pieces provided on opposite sides of said carriage, each of said center pole pieces having a recessed portion, a coil bobbin having a driving coil wound thereon fixedly mounted on said carriage in such a manner as to be magnetically linked with each of said magnetic circuits and, to surround said carriage, and to form spaces between opposite sides of said carriage and said center pole pieces of said magnetic circuits, guide rails provided in said spaces, respectively between opposite sides of said carriage and said center pole pieces of said magnetic circuits and disposed within the recessed portion of said center pole pieces, said guide rails supporting said carriage and said driving coil for linear movement along said guide rails, and a plurality of rollers rotatably mounted to said carriage, and in peripheral contact with said guide rails, and supporting the moving elements comprising said carriage, said bobbin, and said driving coil on said guide rails.

6. The carriage assembly of claim 5, wherein at least three of said rollers are provided on each side of carriage in contact with a respective one of said guide rails, an angle of a center one of each said three rollers with respect to a direction of movement of said carriage being different from an angle of the other two of said three rollers with respect to said direction of movement.

7. The carriage assembly of claim 5, wherein at least two pairs of rollers are provided on one side of carriage and at least a pair of rollers are provided on the other side of carriage in contact with a respective one of said guide rails.

8. The carriage assembly of claim 5, wherein each of said magnetic circuits comprises a generally rectangular-frame yoke case having a permanent magnet fixed to one side thereof, said bobbin passing through said yoke.

* * * * *